United States Patent [19]

Taig

[11] Patent Number: 5,328,002
[45] Date of Patent: Jul. 12, 1994

[54] APPLY AND RELEASE HYDRAULIC PARKING VALVE

[75] Inventor: Alistair G. Taig, Edwardsburg, Mich.

[73] Assignee: Allied-Signal Inc., Morristown, N.J.

[21] Appl. No.: 986,310

[22] Filed: Dec. 7, 1992

[51] Int. Cl.$^5$ .............................. G05G 1/04
[52] U.S. Cl. .......................... 188/67; 74/527
[58] Field of Search ............ 74/527, 110; 188/57, 188/82.7, 382

[56] References Cited

U.S. PATENT DOCUMENTS

| 3,891,182 | 6/1975 | Schwerin | 74/527 |
| 4,796,860 | 1/1989 | Diel | 74/527 |

FOREIGN PATENT DOCUMENTS 2151758  7/1985  United Kingdom ............... 74/527

Primary Examiner—Matthew C. Graham
Attorney, Agent, or Firm—Larry J. Palguta; Ken C. Decker

[57] ABSTRACT

The apply and release hydraulic parking valve (20, 120) comprises a housing (40, 140) having therein a bore (42) with first (52, 152) and second (54, 154) reservoir grooves communicating with one or more reservoir ports (46, 146A, 146B), a supply groove (63) communicating with a supply port (47, 147), and apply (44, 144) and release ports (48, 148) communicating with said bore (42, 142). A spool valve (60, 160) is located slidably within the bore (42), the spool valve (60, 160) activated by a lever (31, 131) received within an opening (67, 167) of the spool valve (60, 160). One end of the spool valve (60, 160) has a pair of washers (74, 76) disposed thereabout with a spring member (80, 180) located about the spool valve (60, 160) and between the washers (74, 76), and a stop sleeve (82, 182) located about the spool valve (160, 60). The spool valve (60, 160) includes a chamfered groove (61) engaging a check valve (50, 150) within the supply port (47, 147). Displacement of the lever (31, 131) effects axial displacement of the spool valve (60, 160) which opens the check valve (50, 55) to permit hydraulic fluid pressure to be communicated to the bore (42) and with the apply and release ports (44, 144, 48, 148) corresponding to the direction of axial displacement of the spool valve (60, 160).

3 Claims, 4 Drawing Sheets

APPLY AND RELEASE HYDRAULIC PARKING VALVE

The present invention relates generally to a hydraulic valve, and in particular to an apply and release hydraulic parking valve for a vehicle braking system.

BACKGROUND OF THE INVENTION

Parking brake mechanisms utilizing pressurized hydraulic fluid to apply and release the brakes have been disclosed previously in U.S. Pat. No. 5,161,650 and copending U.S. Pat. Nos. 5,201,387 and 5,128,007, assigned to the same assignee and incorporated by reference. U.S. Pat. No. 5,281,007 discloses an electric solenoid operated system for effecting the parking application and release of brakes such as those disclosed in U.S. Pat. No. 5,161,650. It is highly desirable to provide a mechanically and hydraulically operated parking valve which has a high degree of reliability and which would cost less than an electrically controlled system. However, such a mechanically and hydraulically controlled parking valve must meet all legal and functional requirements. When the valve is not being used to apply or release the brakes for parking, hydraulic pressure must be released from the brake lines, but maintained within an accumulator supply line with zero leakage. When the vehicle operator selects to apply or release the parking valve, the valve must remain by itself in the apply or release position or mode until the hydraulic actuators within the vehicle brakes have completed their movements, and then must return automatically to the off or inactive position. Also, if an accumulator within the parking brake system is not charged above a predetermined hydraulic pressure, it must not be possible to effect a release of the brakes because of a legal requirement that once the brakes are released, the system must be able to reapply the brakes. Therefore, the parking valve must prevent a release of the brakes if the accumulator within the parking brake system is not charged above a predetermined pressure.

SUMMARY OF THE INVENTION

The present invention provides solutions to the above problems by providing a hydraulic valve, comprising a housing having therein a bore with a first reservoir groove and a second reservoir groove each communicating with a respective reservoir port, a supply groove of the bore located between the reservoir grooves and communicating with a supply port, an apply port and a release port communicating with the bore, a spool valve located slidably within said bore and comprising a longitudinal through passage with orifice means located at the through passage, a first groove and a second groove, and reception means, the first groove communicating with a spool valve radial opening that communicates with said longitudinal through passage, resilient means disposed at the spool valve and positioned by the housing, actuation means received within said housing and received at the reception means of the spool valve, and the supply port including valve means, such that operation of the actuation means effects displacement of said spool valve that effects an opening of said valve means to supply hydraulic fluid pressure to said supply groove, one of the first and second grooves, and apply port so that hydraulic fluid pressure flows from the hydraulic valve and a corresponding return flow of hydraulic fluid flows through the release port, one of the first and second grooves, and respective reservoir groove such that hydraulic fluid pressure retains the spool valve in a displaced position against the resilient means until a decrease in fluid pressure differential across said orifice means results in the resilient means returning the spool valve to an inactive position.

BRIEF DESCRIPTION OF THE DRAWINGS

One way of carrying out the invention is described in detail below with reference to the drawings which illustrate embodiments in which.

DETAILED DESCRIPTION OF THE INVENTION

Figure 1:
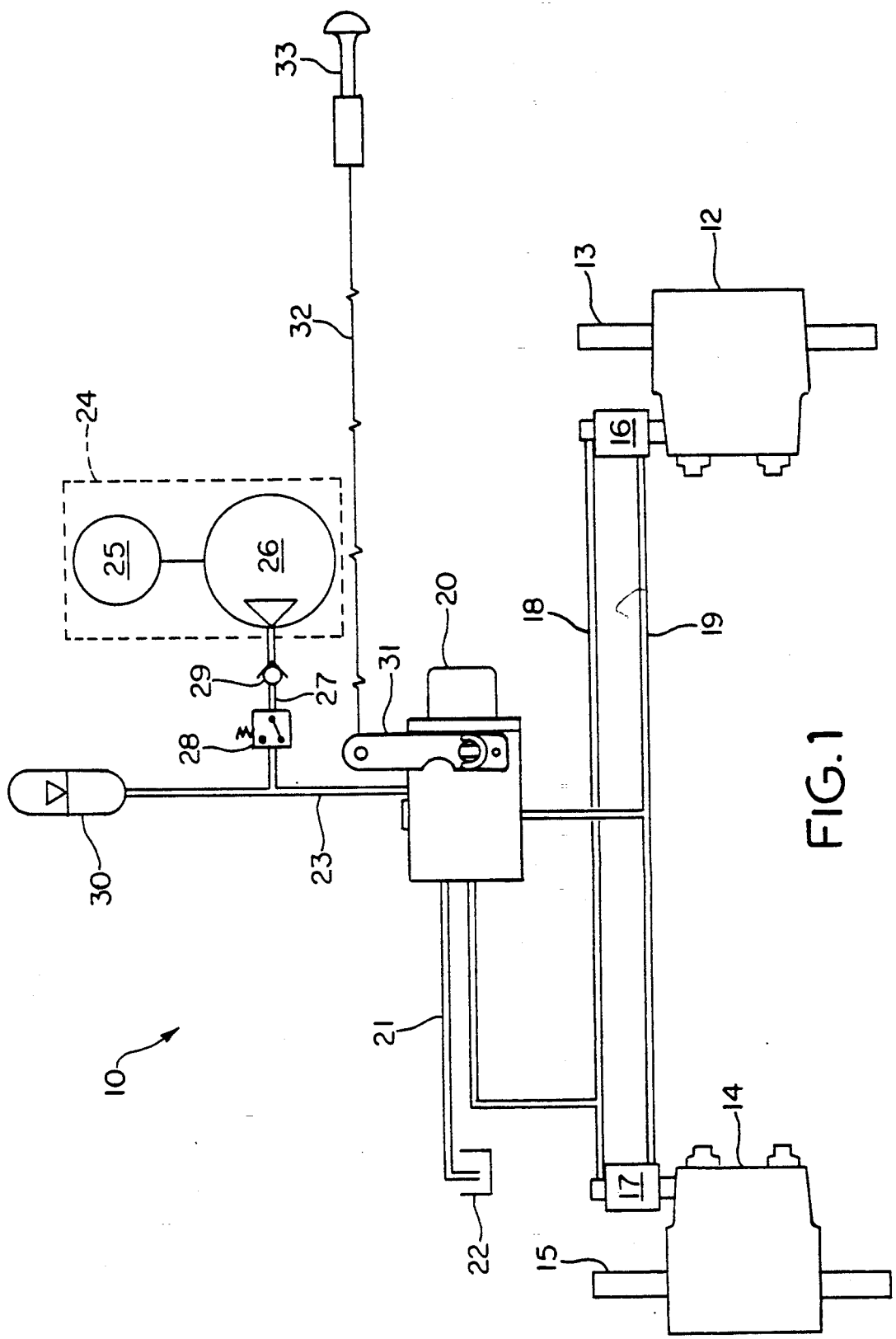
FIG. 1 is a schematic illustration of a hydraulic parking brake system incorporating the hydraulic parking valve of the present invention.

FIG. 1 illustrates a hydraulic parking system designated generally by reference numeral 10. System 10 includes a pair of disc brakes 12 and 14 each of which may control the rotational movement of respective rotors 13 and 15. Disc brakes 12 and 14 have hydraulic parking actuators 16, 17 which may be the hydraulic parking actuators disclosed in U. S. Pat. No. 5,161,650 and copending U.S. Pat. Nos. 5,201,387 and 5,281,007. Brakes 12 and 14 have separate hydraulic lines (not shown) which provide hydraulic fluid pressure for service braking. Hydraulic parking actuators 16 and 17 are connected with apply hydraulic line 18 and release hydraulic line 19 that communicate with hydraulic valve 20. Hydraulic valve 20 has reservoir line 21 connecting with reservoir 22, and supply line 23 connecting with pressure producing means designated generally by numeral 24. Pressure producing means 24 comprises electric motor 25 driving hydraulic pump 26 connected with fluid pressure line 27 which includes one-way check valve 29 and pressure switch 28. Supply line 27 communicates with line 23 which includes accumulator 30. Hydraulic valve 20 includes actuation means or lever 31 connected via an apply and release control comprising control rod or cable 32 with a push-pull control 33 that may be operated by the vehicle operator.

Figure 2:
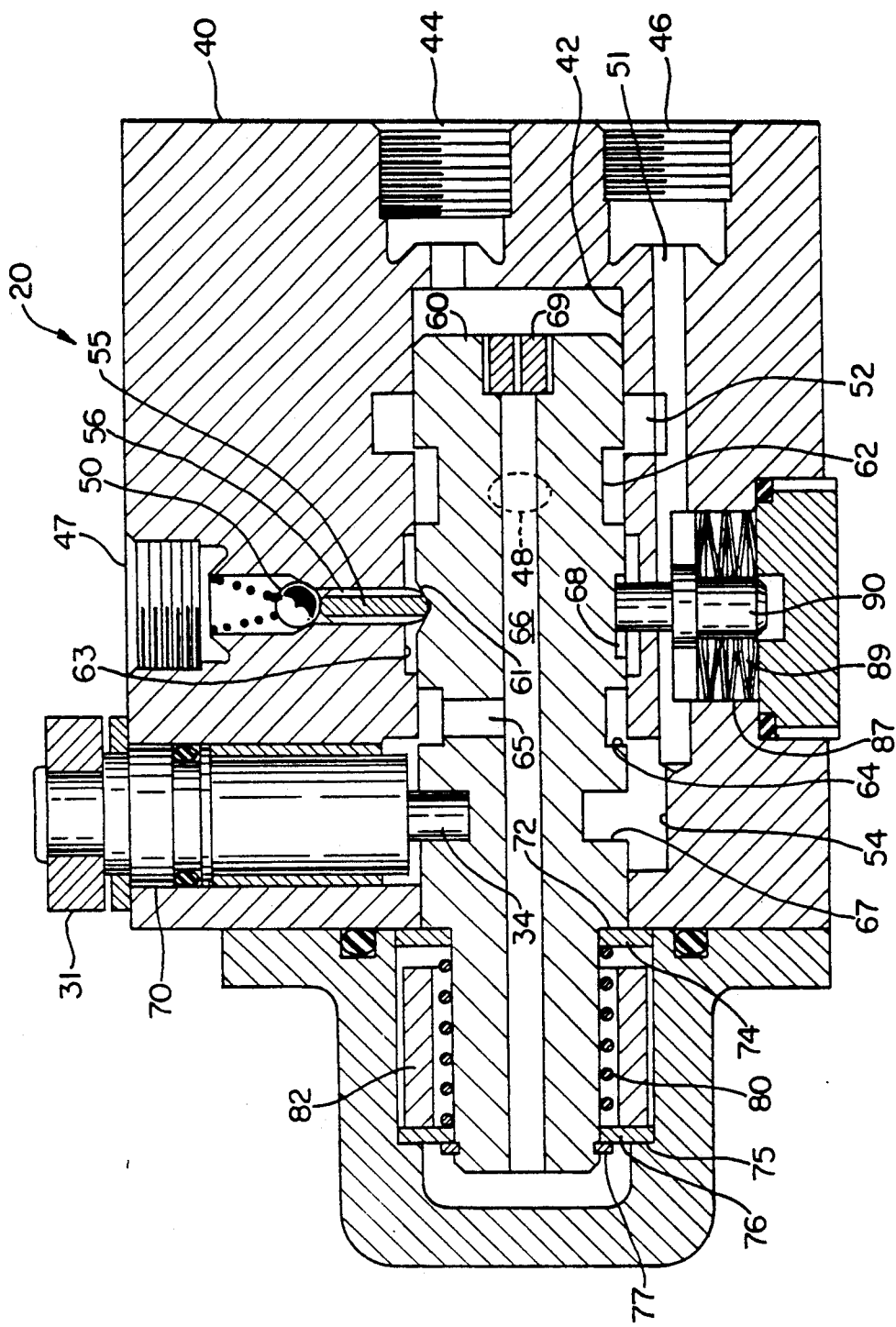
FIG. 2 is a section view of the hydraulic parking valve of the present invention.

Referring to FIG. 2, hydraulic valve 20 comprises housing 40 that includes bore 42 communicating with apply port 44, reservoir port 46, supply port 47 and release port 48 which is shown in dotted line outline within bore 42 so that its location relative to the bore is apparent from the illustration. Supply port 47 includes one-way check valve 50 which engages pin 55 having flutes 56 and communicates with supply groove 63. Reservoir port 46 communicates with reservoir passage 51 that communicates with first reservoir groove 52 and second reservoir groove 54, each of the reservoir grooves communicating with bore 42. Located within bore 42 is spool valve 60 which includes thereabout release groove 62, apply groove 64 communicating with radial opening 65 that communicates with longitudinal through passage 66, orifice member or means 69 located at one end of spool valve 60 and communicating with longitudinal through passage 66, and opening or reception means groove 67 which receives eccentric member 34 of lever 31 located within housing lateral bore 70 that communicates with bore 42. Spool valve 60 includes shoulder 72 against which abuts stop washer 74 located opposite another stop washer 76. Stop washer 76 abuts housing shoulder 75 and snap ring 77 affixed to spool valve 60. Located between stop washers 74 and 76 is resilient means or spring member 80 which biases the washers apart from one another and into engagement with shoulders 72 and 75. Located about resilient means 80 is stop sleeve 82 which can engage washers 74 and 76 in order to limit to a predetermined extent the longitudinal displacement of spool valve 60. Spool valve 60 includes chamfered groove 61 receiving abuttingly the other end of pin 55 having flutes 56. Aligned with supply groove 63 of housing 40 is axial groove 68 of spool valve 40. Housing 40 includes opening 87 including therein a stack of Belleville washers or spring means 89 biasing pressure sensitive pin 90 into axial groove 68.

Hydraulic parking system 10 and hydraulic valve 20 operate as follows. When the vehicle operator wishes to actuate .brakes 12 and 14 for a parking brake application, the operator pulls control 33 which effects a displacement of actuation means or lever 31. The displacement of lever 31 effects rotation of eccentric 34 (see FIG. 2) and effects a rightward movement of spool valve 40. As spool valve 40 moves to the right, chamfered groove 61 is displaced toward the right which moves pin 55 upwardly against check valve 50 so that hydraulic fluid pressure provided via accumulator 30 and pressure producing means 24 flows through supply port 47 and into supply groove 63. As spool valve 60 moves to the right, apply groove 64 aligns with supply groove 63 so that the hydraulic fluid pressure from supply port 47 flows through radial opening 65, into longitudinal through passage 66, through orifice means 69, to apply port 44, apply line 18, and the respective parking actuators 16 and 17. At the same time, release groove 62 of spool valve 60 (which is always aligned with release port 48) becomes more directly aligned with first reservoir groove 52 so that hydraulic fluid exiting parking actuators 16 and 17 may flow through release line 19 to release port 48, release groove 62, first reservoir groove 52, reservoir passage 51 and to reservoir port 46, reservoir line 21 and reservoir 22. When spool valve 60 is displaced toward the right for a parking brake application, the hydraulic fluid pressure from supply port 47 effects a positive displacement of spool valve 60 toward the right and the pressure differential across orifice means 69 will continue to maintain that displacement as long as the pressure differential exists. Rightward displacement of spool valve 60 is against resilient means 80 which is effecting a reaction or biasing force against the rightward movement of spool valve 60. When hydraulic fluid flow through apply port 44 ceases, the pressure differential across orifice means 69 will decrease and resilient means 80 will effect a return or centering movement of the spool valve toward the left so that the spool valve and lever 31 return to their illustrated inactive, at-rest positions wherein pin 55 re-enters chamfered groove 61 so that check valve 50 closes and hydraulic fluid pressure is no longer provided via supply port 47. Pressure sensitive pin 90 extends into axial groove 68 of spool valve 60 and the length of axial groove 68 is long enough that pressure sensitive pin 90 will never interfere with the rightward or application movement of spool valve 60. However, pressure sensitive pin 90 will prevent the leftward or release movement of spool valve 60 unless a sufficient and predetermined hydraulic pressure level is present at supply port 47.

When the vehicle operator wishes to release hydraulic parking actuators 16 and 17, control 33 is pushed so that lever 31 is moved to the left of its centered position illustrated in FIG. 1. Control 33 is of the type that will remain in an extended or pulled position to indicate that the hydraulic parking brakes have been applied, even after the hydraulic parking application has ceased and the lever 31 has returned previously to its illustrated at rest position (see description of FIGS. 3 and 4). The leftward movement or rotation of lever 31 in FIG. 1 effects in FIG. 2 a leftward movement of spool valve 60. As spool valve 60 moves slightly to the left during the initial rotation of lever 31 and eccentric member 34, the chamfered groove moves pin 55 upwardly against check valve 50 to permit hydraulic fluid pressure to enter supply port 47 and supply groove 63. If a predetermined level of hydraulic fluid pressure is present via supply port 47, the hydraulic fluid pressure will effect a retraction of pressure sensitive pin 90 against spring means 89 so that spool valve 60 may move further toward the left and effect a release of parking brake actuators 16, 17. When spool valve 60 is displaced toward the left, release groove 62 is aligned with supply groove 63 so that the hydraulic fluid pressure from accumulator 30/pressure producing means 24 is supplied to release port 48, release line 19 and hydraulic parking actuators 16 and 17. Simultaneously, fluid being returned from hydraulic parking actuators 16 and 17 to hydraulic valve 20 via apply line 18 and apply port 44 flows through orifice means 69, longitudinal through passage 66, to radial opening 65 and through apply groove 64 which is more directly aligned with second reservoir groove 54. The returning fluid flows through second reservoir groove 54 and reservoir passage 51, out reservoir port 46, reservoir line 21 and to reservoir 22. A pressure difference is developed across orifice means 69 which will hold spool valve 60 in its leftward position until fluid flow ceases and resilient means 80 which engages washer 74 displaced via spool valve shoulder 72, effects a centering or return movement of spool valve 60 to its illustrated inactive position. When spool valve 60 is returned to its inactive or at rest position, lever means 31 is always rotated to its illustrated, at-rest position shown in FIG. 1.

The apply and release hydraulic parking valve of the present invention provides a low-cost, highly reliable mechanically and hydraulically operated valve which provides substantial advantages for a hydraulic parking system. When valve 20 is not being utilized to apply or release brakes 12, 14, fluid pressure is released from the brake lines. Note that release groove 62 and apply groove 64 are slightly aligned respectively with first reservoir groove 52 and second reservoir groove 54 in the inactive position illustrated in FIG. 2. Because of possible temperature expansion of hydraulic fluid, it is important that the fluid within apply and release lines 18 and 19 be fully released. However, check valve 50 maintains hydraulic fluid pressure within supply line 23 without any leakage. When the vehicle operator selects to apply or release the parking brakes via valve 20, valve 20 will remain within the apply or release mode until parking actuators 16, 17 of brakes 12, 14 have completed their movements, and then valve 20 will automatically return to the off or inactive position illustrated in FIG. 2. Additionally, if accumulator 30 is not charged above a predetermined pressure so that this pressure is present at supply port 47, pressure sensitive pin 90 will not be depressed and any attempt by the vehicle operator to release the brakes via operation of control 30, rotation of lever 31 and eccentric member 34, will not occur because pin 90 will not be depressed by the insufficient hydraulic fluid pressure. It is required that a vehicle operator must not be able to release the brakes from a parking application unless he will be able to subsequently reapply the brakes for a parking application. This is important in order to prevent a runaway vehicle situation. Thus, unless there is sufficient hydraulic pressure present at supply port 47, pressure sensitive pin 90 will not be depressed and the vehicle operator cannot effect a release of parking actuators 16, 17.

Figure 3:
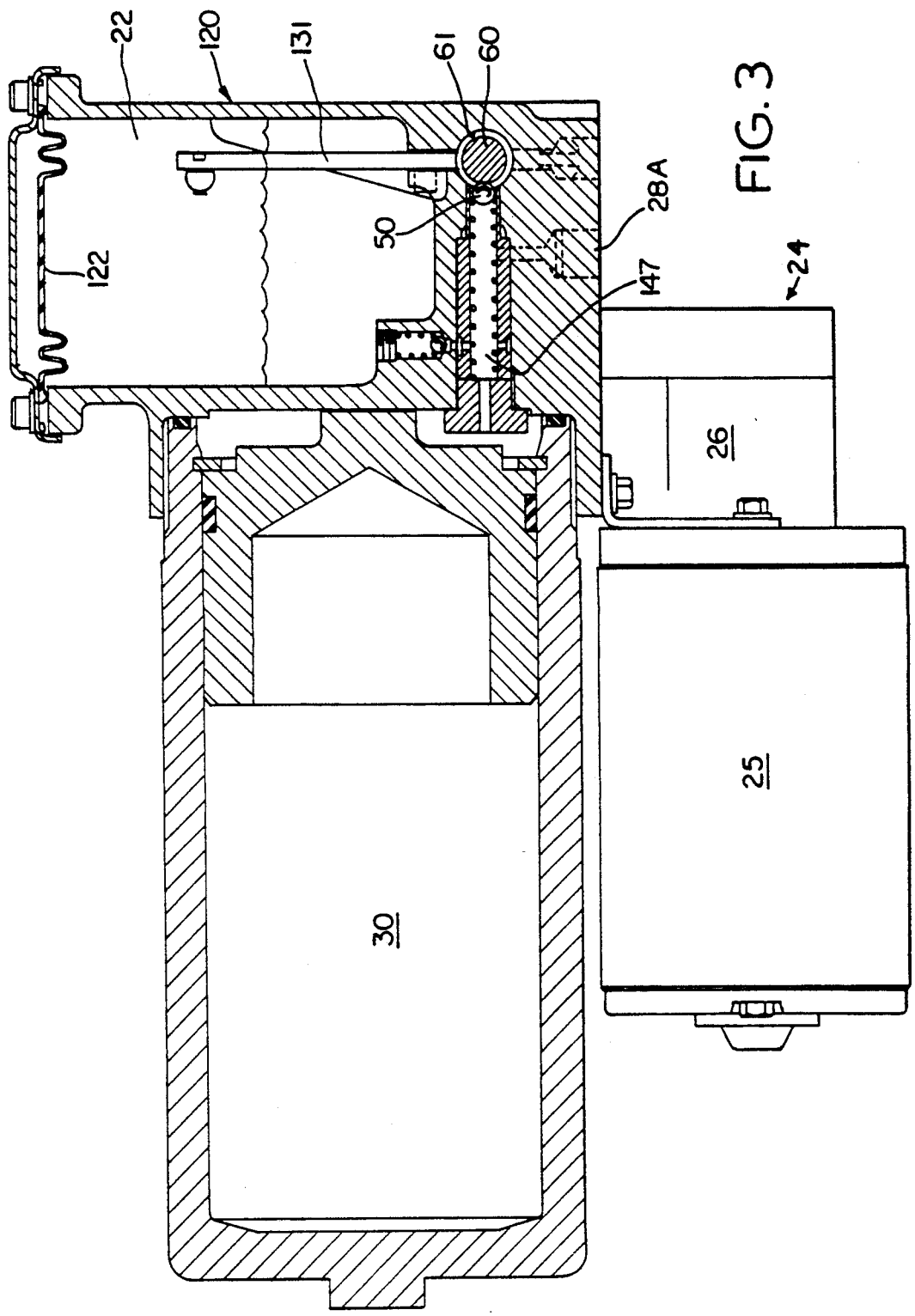
FIG. 3 is a section view of the preferred embodiment of the present invention.
Figure 4:
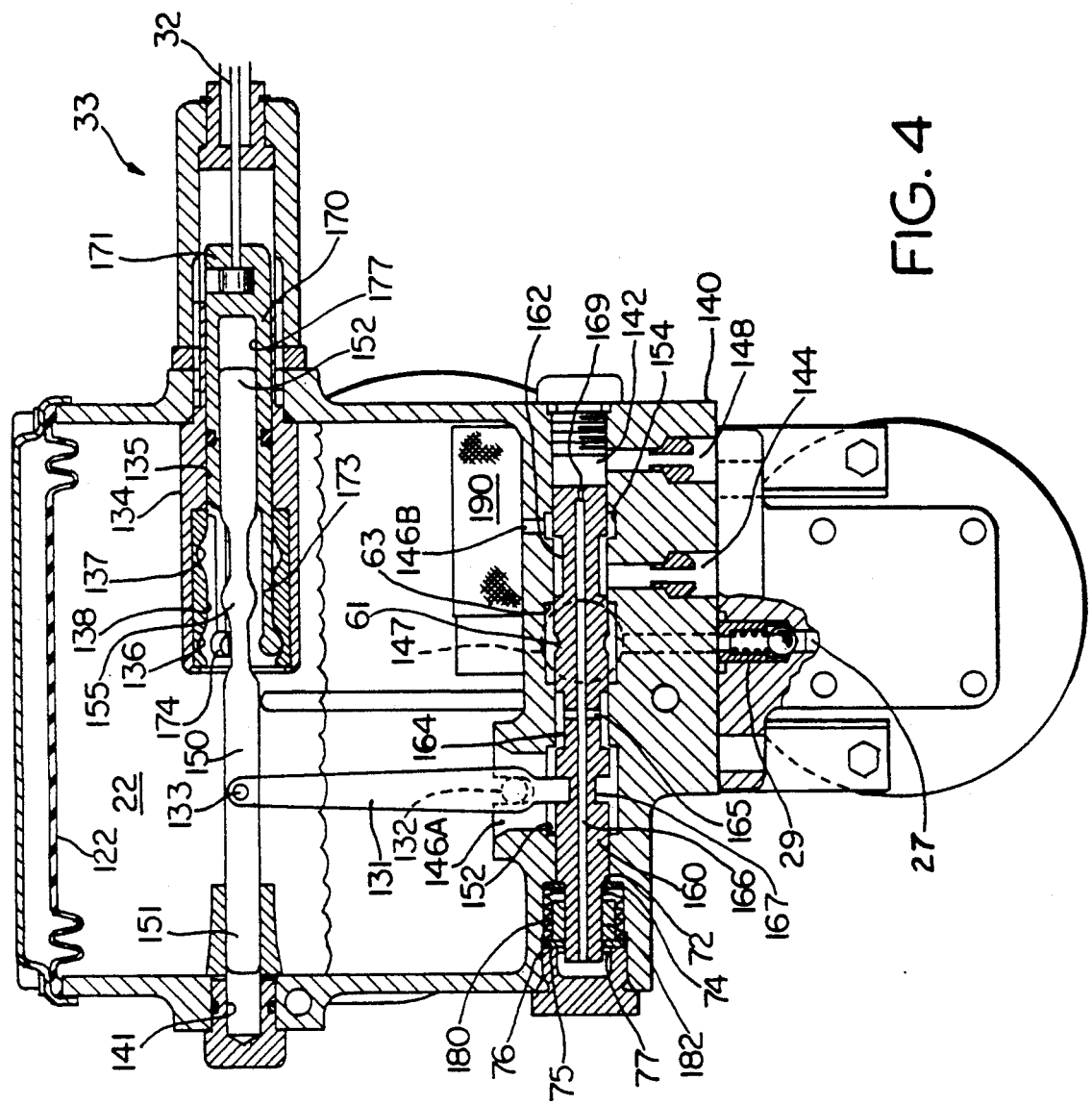
FIG. 4 is another section view of the preferred embodiment of the present invention.

FIGS. 3 and 4 illustrate in section view the preferred embodiment of the present invention. Structure within FIGS. 3 and 4 which is similar to the structure illustrated in FIGS. 1 and 2 will be identified by the same reference numeral. Hydraulic valve 120 comprises housing 140 that includes bore 142 communicating with apply port 144, release port 148, and reservoir ports 146A, 146B. The orientation of the ports in FIGS. 1 and 2 has been changed slightly and the flow pattern has been reversed. As will become apparent, fluid pressure may flow either around or through the spool valve for either application or release of the parking brakes according to the fluid flow pattern desired for the hydraulic valve. Housing 140 has incorporated therein reservoir 22 (see FIG. 3), accumulator 30, pressure producing means 24 comprising electric motor 25 driving hydraulic pump 26 connected with fluid pressure line 27 that includes one-way check valve 29 (see FIG. 4). Hydraulic pump 26 draws fluid from reservoir 22 via filter 190. FIG. 3 illustrates a pressure switch connection port 28A which communicates with a not shown pressure switch corresponding to the pressure switch 28 of FIG. 1. Supply line 27 (FIG. 4) communicates with supply port 147 (see FIG. 3) which communicates directly with accumulator 30. Hydraulic valve 120 includes push-pull control 33 connected with control rod or cable 32 coupled with a not shown actuation knob for operation by the vehicle operator. Push-pull control 33 is coupled with lever 131 to provide an actuation means that actuates spool valve 160.

Referring to FIG. 3, supply port 147 communicates fluid pressure from the accumulator and pump via one-way check valve 50 which engages directly chamfered groove 61 of spool valve 160. Bore 142 includes axially spaced apart reservoir grooves 152, 154 (see FIG. 4) located about supply groove 63. Located within bore 142 is spool valve 160 which includes thereabout an apply or second groove 162, chamfered groove 61, and a release or first groove 164 which communicates with radial opening 165 that communicates with longitudinal through passage 166. At the end of longitudinal through passage 166 is orifice member or restricter 169. Spool valve 160 includes opening 167 which receives an end of lever 131 positioned about pivot 132. Spool valve 160 includes shoulder 72 against which abuts stop washer 74 located opposite another stop washer 76. Stop washer 76 abuts housing shoulder 75 and snap ring 77 affixed to spool valve 160. Located between stop washers 74 and 76 is resilient means or spring member 180 which biases the washers apart from one another and into engagement with shoulders 72 and 75. Located within resilient means 180 and between stop washers 74 and 76 is stop sleeve 182 which can engage washers 74 and 76 in order to limit to a predetermined extent the longitudinal displacement of spool valve 160.

Lever 131 is attached by means of pin 133 which is part of the push-pull control 33. Control 33 comprises sleeve member 134 having therein longitudinal opening 135 with axially spaced apart, circumferential ramped recesses 136 and 137. Located between ramped recesses 136, 137 is radially inner shoulder 138. Collet control actuator 170 is coupled at end 171 with control rod or cable 32 and includes at least three axially extending fingers 173 having at the ends thereof knobs 174. Collet control actuator 170 includes interior opening 177 receiving slidably therein an end 152 of control rod 150. End 151 is received slidably within housing opening 141 and lever 131 attached adjacent thereto via pin 133. End 152 of control rod 150 is slidably received within interior opening 177 of actuator 170. Control rod 150 includes control ball 155 shown in an at-rest position adjacent shoulder 138 of sleeve member 134.

Hydraulic valve 120 with internally situated push-pull control 33 is connected with apply hydraulic line 18, release hydraulic line 19, hydraulic parking actuators 16 and 17, and brakes 12 and 14 illustrated in FIG. 1, and operates as follows. When the vehicle operator wishes to actuate brakes 12 and 14 for a parking brake application, the vehicle operator pulls the not shown actuation knob which effects displacement of control rod or cable 32 and collet control actuator 170. As collet control actuator 170 is displaced toward the right in FIG. 4, each of the knobs 174 is moved along ramped recess 136 and moves toward one another as they each engage shoulder 138. This causes knobs 174 to move radially inwardly and grab positively control ball 155 so that ball 155 and control rod 150 are moved toward the right. When collet control actuator 170 reaches a full apply position, control knobs 174 extend resiliently and radially outwardly away from one another into ramped recess 137 whereby control ball 155 is released. The displacement toward the right of control rod 150 in FIG. 4 causes lever 131 to pivot about pivot 132 and displace spool valve 160 to the left. As spool valve 160 moves leftwardly in FIG. 4, chamfered groove 61 displaces check valve 50 (FIG. 3) to provide hydraulic fluid pressure to apply groove 162 aligned with supply groove 63 so that the hydraulic fluid pressure is transmitted to apply port 144, apply hydraulic line 18 and the respective parking actuators 16 and 17. At the same time, release groove 164 is moved into alignment with reservoir groove 152 and reservoir port 146A so that hydraulic fluid exiting parking actuators 16 and 17 may flow through release line 19 to release port 148, bore 142, through orifice member or restricter 169, through longitudinal passage 166, radial opening 165, release groove 164, and to reservoir groove 152 for communication via reservoir port 146A to reservoir 22. When spool valve 160 is displaced toward the left for a parking brake application, the hydraulic fluid pressure from supply port 147 effects a positive displacement of spool valve 160 toward the left and the pressure differential across orifice member 169 will continue to maintain that displacement as long as the pressure differential exists. Leftward displacement of spool valve 160 is against resilient means 180 which is effecting a reaction or biasing force against the leftward movement of spool valve 160. When hydraulic fluid flow through apply port 144 ceases, the pressure differential across orifice member 69 will decrease and resilient means 180 will effect a return or centering movement of the spool valve toward the right so that the spool valve and lever 131 return to their illustrated inactive, at-rest positions wherein one-way check valve 50 reenters chamfered groove 61 and hydraulic fluid pressure is no longer provided via apply port 147. As lever 131 pivots so that the upper portion returns leftwardly and control ball 155 returns to the illustrated at-rest position, knobs 174 remain within ramped recess 137 so that collet control actuator 170 remains stationary and the not shown actuation knob remains in an outwardly or applied position while the parking brakes remain actuated.

When the vehicle operator wishes to release hydraulic parking actuators 16 and 17, the not shown actuation knob is pushed so that control rod or cable 32 is moved toward the left in FIG. 4 and collet control actuator 170 is moved correspondingly to the left. As control actuator 170 moves to the left, knobs 174 are displaced out of ramped recess 137 and as they engage shoulder 138 they are biased radially inwardly to engage the right side of control ball 155 and displace control rod 150 to the left in FIG. 4. As control rod 150 is displaced to the left, lever 131 is pivoted about pivot 132 so that spool valve 160 is displaced to the right in FIG. 4. When collet control actuator 170 reaches its full release position, knobs 174 extend resiliently within ramped recess 136 so that control ball 155 is released therefrom. As spool valve 160 is displaced toward the right in FIG. 4, chamfered groove 61 is moved out of alignment with one-way check valve 50 to cause hydraulic fluid pressure to enter supply port 147 and supply groove 63. When spool valve 160 is displaced toward the right in FIG. 1, release groove 164 is aligned with supply groove 63 so that hydraulic fluid pressure from supply port 147 is provided to radial opening 165, longitudinal through passage 166, orifice member 169, release port 148, release hydraulic line 19, and actuators 16 and 17. Return fluid flow from actuators 16 and 17 flows through line 18 and apply port 144 to apply groove 162 which is now aligned with reservoir groove 154 and reservoir port 146B for fluid flow communication with reservoir 22. A pressure difference is developed across orifice member 169 which will hold spool valve 160 in its rightward position until fluid flow ceases and resilient means 180 which engages washer 76 displaced via snap ring 77, effects a centering or return movement of spool valve 160 to its illustrated inactive position. When spool valve 160 is returned to its inactive or at-rest position, lever means 131 is pivoted about pivot 132 so that rod 150 moves toward the right in FIG. 4 and returns to its illustrated, at-rest position. Because knobs 174 are located within ramped recess 136, ball 155 returns to the illustrated, at-rest position without effecting a change of position of the not shown actuation knob.

Apply and release hydraulic parking valve 120 provides significant improvements. During the release of brakes 12, 14, cable friction is not involved in the actuation of valve 120 because push-pull control 33 is now located at the opposite end of cable 32, i.e. is now located within valve 120. Additionally, pressure sensitive pin 90, spool valve axial groove 68, Belleville washers or spring means 80 are eliminated by providing a different not shown control to ensure that the vehicle operator cannot release brakes 12, 14 if insufficient hydraulic pressure is present at supply port 147. The hydraulic parking system includes a not shown lockout feature comprising a solenoid located at the vehicle operator actuation knob that, if insufficient hydraulic pressure is available at port 147, is actuated and locks the actuation knob in the extended or apply position. The not shown solenoid would be operated via a pressure sensing device responsive to insufficient hydraulic fluid pressure present at supply port 147. Thus, when there is insufficient hydraulic fluid pressure at supply port 147, any attempted release of the brakes by the vehicle operator is prevented via a positive locking feature at the not shown actuation knob rather than a feature located within hydraulic valve 120. The vehicle operator will not be able to return the actuation knob to the release position and will know definitely that there is a problem in the hydraulic pressure system. Reservoir 22 includes a flexible breathing diaphragm 122 which varies its position according to the level of hydraulic fluid contained within reservoir 22. As hydraulic fluid is returned initially to reservoir 22 during operation of pump 26, diaphragm 122 will move downwardly therewith. This prevents the entry of dirt and other contaminants within reservoir 22.

I claim:

1. A push-pull control, comprising a sleeve member having an interior longitudinal opening with first and second axially spaced apart recess means located therein, a control actuator located slidably within the longitudinal opening and comprising a plurality of axially extending arms with knob members located at respective ends thereof, the knob members disposed within the first recess means, and a control rod having a ball member disposed between said arms and adjacent the knob members thereof, so that displacement of the control actuator effects movement of the knob members out of the first recess means and radially inwardly to grip the ball member and move the ball member and control rod to a displaced position where the knob member expand radially outwardly into the second recess means and release the ball member such that a return movement of the ball member and control rod to an initial at-rest position will not effect displacement of the control actuator from the displaced position.

2. The push-pull control in accordance with claim 1, wherein the control rod includes an axial end received slidably within an axial opening of said control actuator.

3. The push-pull control in accordance with claim 2, wherein the control actuator comprises a collet control actuator and the sleeve member has a radially inwardly shoulder disposed between said first and second recess means to maintain the knob members at a radially inwardly position during displacement of said collet control actuator.

* * * * *